Nov. 20, 1934.                C. M. SEMLER                 1,981,201
                               CURING BAG
                         Filed March 29, 1933      2 Sheets-Sheet 2
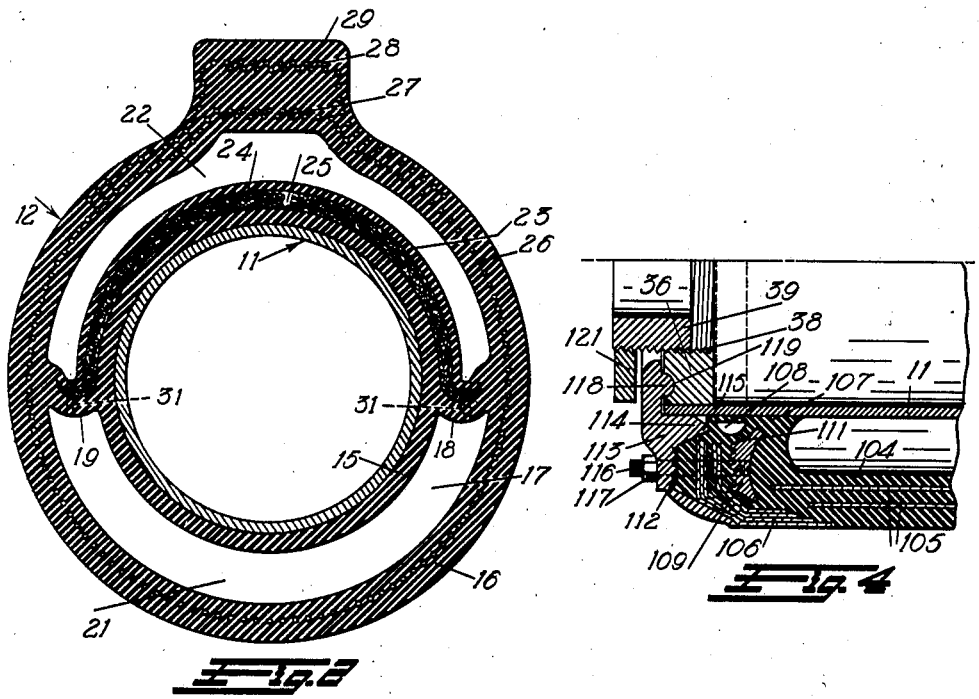
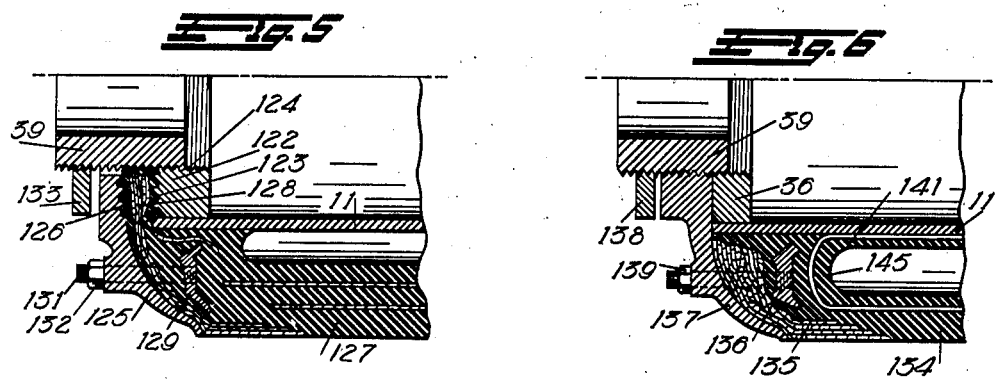
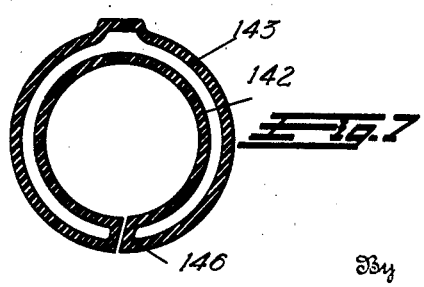
Inventor
C. M. Semler
By Strauch & Hoffman
Attorneys Patented Nov. 20, 1934

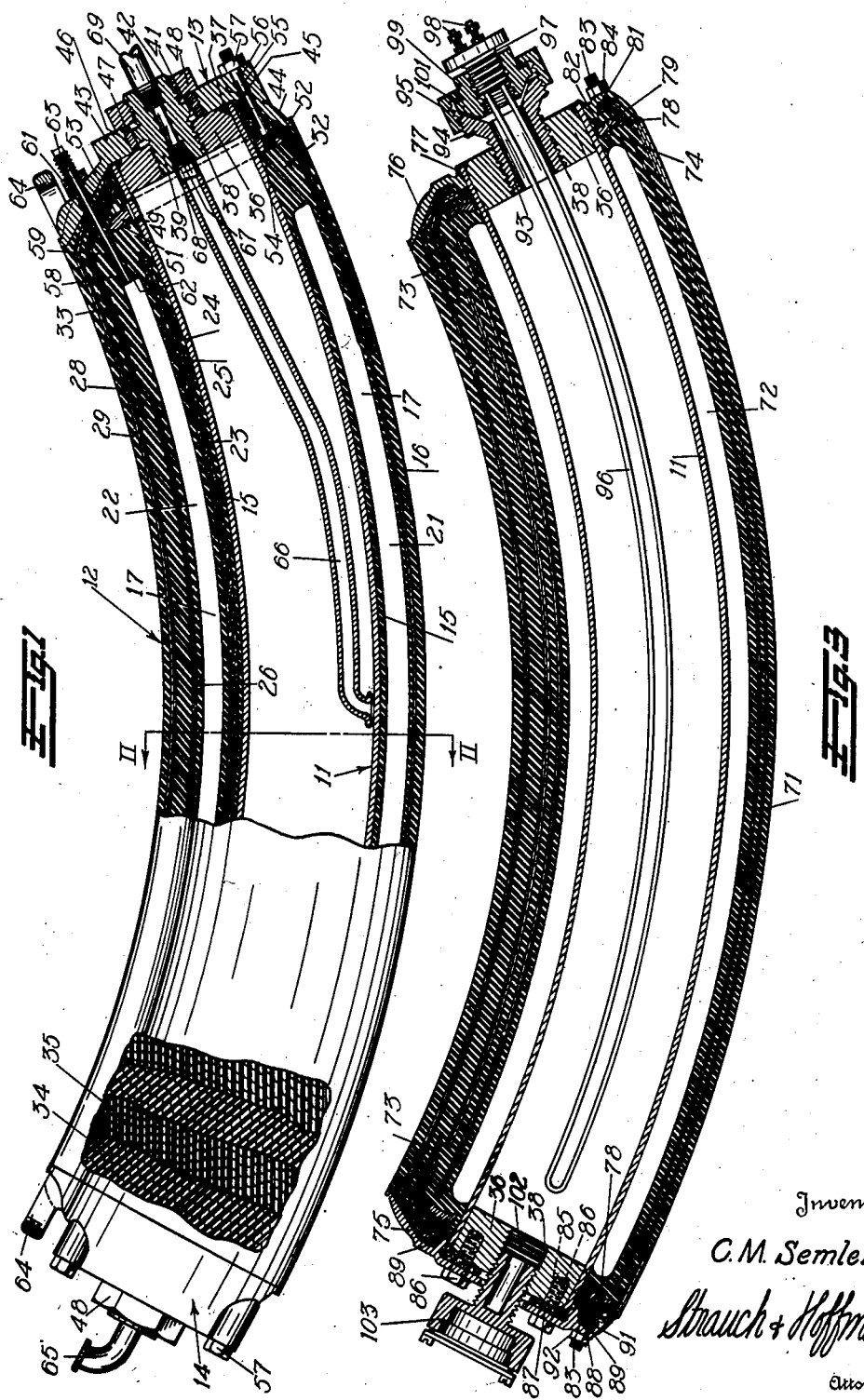

1,981,201

UNITED STATES PATENT OFFICE 1,981,201

CURING BAG

Clyde M. Semler, Stow, Ohio

Application March 29, 1933, Serial No. 663,393

19 Claims. (Cl. 18—45)

The present invention relates to devices for curing and repairing tires—i. e., for operating upon rubber tire casings which are designed to receive inflated inner tubes—and is intended as an improvement over prior similar devices and over the curing bags disclosed in my copending applications Serial No. 511,370, filed January 26, 1931, and Serial No. 599,776, filed March 18, 1932.

A major object of my invention is the provision of a novel curing bag having an expansible sleeve portion which, upon becoming deteriorated or worn beyond usefulness, may be readily replaced at low cost, without replacement of the remaining portions of the curing bag.

A further object of my invention is the provision of novel and effective means of sealing the ends of a multi-part curing bag against the escape of fluid therefrom, the nature of the sealing means being such that the bag may be readily disassembled to permit the insertion of new parts when required.

The nature and construction of expansible sleeves hitherto employed in curing bags has not been altogether satisfactory since they have been found susceptible to being torn away from the end assemblies when subjected to the necessary fluid pressure. This defect has been overcome in the sleeve of my invention since a major object of the invention is to incorporate reinforcing means at the ends of the sleeve in such manner that the reinforcing means functions not only to insure retention of the sleeve by the end assemblies, but also to insure efficient sealing of the sleeve against the escape of fluid at the connections with the end assemblies without undesirable interference with the tendency of the sleeve to expand radially when subjected to fluid pressure.

A further object of my invention is to reinforce and seal the ends of a sleeve of a curing bag with reinforcing material in such manner that the material, in spite of its sealing and strengthening function, will permit the entire sleeve to expand radially under pressure to fit the tire within which it may be placed.

A further object of my invention is the provision of a novel joint between a sleeve of a curing bag containing a heating unit, and an end assembly wherein the end of the sleeve is compressed immediately adjacent the heating unit thereby sealing the circumferential contacting portions of the sleeve and the heating unit against the escape of fluid.

It is still a further object of my invention to provide an annular retainer member, formed either integrally or in segments to be used in connection with and enable a sleeve of a curing bag to be quickly and securely sealed to end assemblies of the bag.

Still a further object of my invention is the provision in a curing bag of an auxiliary pressure chamber adjacent an end assembly and a portion of the expansible sleeve embraced thereby for the purpose of applying a packing or compressing force to prevent leakage of fluid from the inflated sleeve of the curing bag.

Still a further object of my invention is to provide joints between an open-ended sleeve of a curing bag containing a heating unit and the end assemblies, having concave surfaces whereby the ends of the sleeve are compressed to form a tight seal against the adjacent end of the heating unit.

Sometimes it so happens that the expansible part of a curing bag has developed a leak therein or has become so cracked as to render it practically impossible to contain air at the required pressure and yet is still in condition to be used as a contact element with the tire being treated. To obtain as much use as possible out of a part in this condition, it is an object of this invention to provide a novel type of pressure container which is so formed that it may be readily inserted into a curing bag and, when subjected to air pressure, will expand the bag walls as if the bag itself were inflated. A removable pressure container of this type may also be employed in connection with a curing bag wherein the end assemblies or sleeve ends are so worn or broken that while the sleeve end is retained in place, it is not possible to economically repair the end assembly and sleeve and prevent the leaking of air from the curing bag. Obviously, the removable pressure container may also be used in new curing bags. When so used, only relatively small portions of the relatively heavy outer sleeve need be formed with the end assemblies or caps, a removable or replaceable pressure container being inserted in the bag to fit back under the end caps and to contact directly with the tire in the central portion of the curing bag.

On some types of tire repair jobs, it may be found advisable to heat-treat only a portion of the tire. Accordingly a major object of the present invention is the provision of a curing bag provided with a heating unit so related to the bag walls that most of the heat emanating therefrom may be concentrated in a portion of the bag for application to a selected portion of the tire, the remaining portion of the curing bag being either heated to a lower temperature, or unheated, or, if desired, cooled by the application of a suitable cooling fluid. This object preferably is accomplished by providing heat transfer retarding means on selected portions of the heating unit and between the boundaries of certain sections of the bag or insulated sections within the curing bag whereby heat losses are reduced to a minimum.

It is a further object of my invention to provide a novel manner of insulating selected portions of a curing bag of the type disclosed against the transfer of heat from the heating unit whereby the heat may be concentrated on a restricted portion of the bag, the entire body of the bag, however, being distended by fluid pressure.

When employing a curing bag, occasions may arise when steam is not available or desirable as a heating medium. Hence it is an object of my invention to provide a novel type of curing bag wherein other means of heating such as electricity or water may be employed, the curing bag being so designed that the heating element thereof may be readily changed to permit the use of different sources of heat without the necessity of using different types of bags.

A further object of my invention is to provide a novel form of electrical heating means adapted to be used in connection with a curing bag and to be easily interchanged with other means of heating such as steam or hot water fittings, whereby the best and cheapest method of heating available in a given shop or factory may be employed.

Still a further object of my invention is to provide an automatic temperature control associated with a curing bag whereby the temperatures existing in the bag may be confined within predetermined limits and the possibility of damage to the bag or tire being treated avoided.

Other general and more specific objects of the present invention will appear upon a study of the following detailed description and claims when taken in conjunction with the accompanying drawings, wherein Figure 1 is a side view of one preferred form of my novel curing bag taken partly in elevation and partly in section to illustrate the angular arrangement of the reinforcing cords at the ends of the sleeve and the manner of constructing the end assemblies;

Figure 2 is an enlarged cross section, taken on the line 2—2 of Figure 1, illustrating one preferred manner of defining and insulating selected compartments of the sleeve against heat from the heating unit;

Figure 3 is a longitudinal section of another preferred form of my invention showing a modified end construction and a manner of heating the bag and controlling the temperature thereof by electric means;

Figure 4 is a fragmentary view in longitudinal section illustrating a preferred manner of sealing and securing the ends of the sleeve of the curing bag, an annular air chamber being provided to further promote the seal;

Figure 5 is a view similar to Figure 4, but illustrating a different manner of sealing the ends of the curing bag sleeve;

Figure 6 is a view also similar to Figure 4 and illustrates still a further manner of sealing the sleeve end, as well as a closed expansible insert for use in the air bag sleeve; and Figure 7 is a cross sectional view on a reduced scale of a form of the removable expansible insert shown in Figure 6 in the annular chamber defined by the heating unit and the sleeve of the curing bag.

The manner of construction of the curing bag of my invention will now be explained in detail, particular reference being had for the moment to the form illustrated in Figure 1 in which a heating unit or tube is generally indicated by an arrow 11, an expansible sleeve concentrically arranged with reference to the heating unit by an arrow 12 and end assemblies by arrows 13 and 14.

Heating unit 11 comprises an open ended tube, preferably arcuately shaped to more readily conform to the interior of a tire, and preferably formed of metal or like material which will hold the tube to substantially fixed length and render it a good heat conductor.

The tube may serve also as a base for building up the tire curing bag to the desired size and shape. Fitted over tube 11 is sleeve 12 which is formed with an inner concentric sleeve portion 15 of a size to closely embrace tube 11. An outer sleeve portion 16 is provided in spaced relation to tube 11 and defines an annular chamber 17 therebetween. Both sleeves are of general pear shape when viewed in cross section as shown in Figure 2 to more readily conform to the shape of the tire being treated.

It may be found desirable in some uses of the curing bag, as for instance in the repairing of tires wherein only certain portions have been damaged to apply a relatively greater amount of heat to such damaged portions than other portions of the tire. For example, in a specific case, suppose the tread of a tire is being repaired, and it is desired to intensify the heat applied to the tread with a corresponding reduction in the heat applied to the other portions of the tire. For such a treatment, a sleeve of the type illustrated in Figures 1 and 2 may be employed to advantage by means of the novel construction now to be described.

With reference to Figure 2, it will be noted that inner sleeve 15 and outer sleeve 16 are joined by a pair of oppositely disposed partitions 18 and 19 which extend across annular chamber 17 and define two compartments 21 and 22, both extending substantially half way around the outer circumference of tube 11. Partitions 18 and 19 are of greater length than the width of annular chamber 17 and in the figure are shown as somewhat folded. The greater length is desirable in order that the partitions 18 and 19 will not be subjected to tension when the width of annular chamber 17 is increased due to inflation of the curing bag by air pressure, but will merely straighten out in accordance with the increased width of chamber 17.

An additional partition 23 is provided in compartment 22, preferably integral with sleeve 16 and spaced from the upper portion of sleeve 16 to define a space designated at 24. It will be noted that this space also extends substantially the full length of partitions 18 and 19.

Since in this particular modification of curing bag, as previously pointed out, it is intended to increase the heat in the lower compartment of the bag which is positioned adjacent the tread of the tire to be treated and correspondingly decrease the heat in the upper compartment, partitions 18 and 19 with space 24 are so provided as to separate compartments 21 and 22. To assure a concentration of heat from tube 11 in compartment 21 and retard the transfer of heat to compartment 22, insulating material 25 such as asbestos, magnesia compounds or the like is provided in space 24. Since space 24 with insulating material 25 extends across partitions 18 and 19, a possible loss of heat from heated compartment 21 to relatively unheated compartment 22 by heat transfer is minimized and a relatively large amount of heat from unit 11 made available in compartment 21 as compared to compartment 22.

When the curing bag is in use, compartments 21 and 22 are inflated with fluid to a relatively high pressure. If it is not desirable to maintain a heat differential between compartments 21 and 22, a single fluid connection leading into either of the compartments may be employed by forming communicating passages 31 in partitions 18 and 19 to conduct the fluid from one compartment to the other. However, when maintaining a temperature differential between the different compartments, it is preferred to modify the curing bag illustrated in Figure 1 by eliminating passages 31 and using separate fluid supply connections to the different compartments. Thus the possibility of a transfer of heat through passages 31 is eliminated while means is provided for maintaining a pressure differential in the various compartments in addition to the heat differential.

Obviously, if it is desired to intensify the heat on other portions of a tire such as one or both of the side walls and not heat the tread, the positions of partitions 18 and 19 with space 24 may be readily changed or the number of partitions increased to insulate the tread portion of the curing bag from the heating unit and concentrate the heat upon the side wall portions. Partition 23 may be omitted and the compartment 22 filled with insulating material such as that designated at 25, this particular arrangement being of especial value in circular bags for curing new tires. If it is desired to insure a lower temperature than normal in the compartments insulated from the heating unit, a cooling fluid may be introduced therein.

Since the sleeve partition material is preferably rubber or a like expansible material capable of ready conformation to a tire wall or tread when placed under pressure, it sometimes happens that due to the numerous successive exposures to high temperatures, cracks form in the walls of the sleeve. To prevent the extension of these cracks to points where they might cause an air leak and thus render the curing bag useless, I provide a protecting means comprising a layer of cords 26, preferably molded with the sleeve material and arranged to overlap at 27. An additional layer of cords is provided at 28 in the bead-engaging portion 29 of the sleeve. The cords are preferably arranged substantially parallel or slightly angular to the longitudinal axis of the sleeve whereby they may protect the sleeve but will not retard or hinder its radial expansion when subjected to air pressure.

With reference to the right hand end of Figure 1, it will be noted that inner sleeve 15 and outer sleeve 16 together with partitions 18 and 19 and their associated elements are brought together to form a solid sleeve and generally indicated at 32 and so formed as to preclude the possibility of the escape of air from the interior compartments. Extending from a point spaced from sleeve end 32, a series of layers of flexible strands or reinforcing cords 33 are provided in outer sleeve 16 extending to substantially the end of the sleeve. In place of cords or strings, chains, small flexible metal strips or the like may be employed as reinforcing material. The layers of reinforcing material are formed one above the other, preferably with films or layers of rubber interposed therebetween. In contradistinction to the manner of providing cords 28 substantially parallel to the longitudinal axis of the sleeve, cords 33 are preferably laid at an acute angle thereto and to each other as shown on the left end of Figure 1. For instance an outer layer 34 is arranged at an angle to the longitudinal axis of the sleeve while an adjacent layer 35 though also arranged at an angle to the same longitudinal axis is at an angle to layer 34, the angles defined by the longitudinal axis of the sleeve and the cord layers being as great as possible without interfering with the tendency of the sleeve to expand radially when subjected to air pressure. This angular arrangement of the respective reinforcing layers of cords has proven to be of unexpected strength and advantage, particularly in preventing the ends of the sleeve from blowing out or pulling away from the end assemblies as they tend to do when inflated to the required pressure. This is believed to be due in part to the so-called thickening of the rubber layers and hence, the retarding of their tendency to flow or escape between contacting portions of the end assembly when subjected to pressure therebetween, and also due in part to the distribution of the end pulling forces throughout a considerable portion of the sleeve by the extension of the reinforcing cord layers for some distance into the body of the sleeve and at an angle to the longitudinal axis thereof.

With the sleeve construction described, it is possible to readily replace worn out sleeves and use the same heating unit and end assemblies for an indefinite period. To do this, it is preferred to provide detachable end assemblies that may be readily removed and replaced when changing sleeves. Such a type of assembly is shown in Figure 1 and will now be described in detail.

Heating unit 11 as before stated serves as a foundation upon which to build or secure the remaining elements of the bag. For this purpose, a closure 36 is provided at the end of tube 11, closure 36 being secured by a friction fit and welded joint to tube 11 as indicated at 37. A tapped hole 38 is provided in closure 36 to accommodate a threaded tube 39 which is provided with an enlarged flange portion 41 and a second threaded portion 42.

Cap 13 is formed in a general concave shape having a flat portion 43 and a ring portion 44, both portions together defining a groove generally indicated at 45. The cap 13 is formed with an aperture 46 of a diameter slightly greater than that of flange 41. Between the surface of aperture 46 and flange 41, a washer 47 of any conventional type may be secured to prevent the escape of heating fluid from the interior of heating element 11. In securing cap 13 to member 39, washer 47 is placed over flange 41 and cap 13 placed thereon, a nut 48 being screwed upon threaded portion 42 of member 39 to hold cap 13 in place.

Adjacent the sleeve end, an annular reinforcing ring 49 is provided. Ring 49 may be formed with the sleeve when molded or it may be placed within an annular recess formed in the interior of the sleeve. It may be formed as a solid ring or divided into segments of suitable size. In either case, it is preferably formed concentric to tube 11 and is provided with a flat rear face 51, a beveled edge 52 and a squared recess or notch 53. A series of tapped holes 54 are provided in ring 49 at spaced distances therearound, studs 55 being secured therein. If ring 49 is formed in segments, at least one stud 55 is provided in each segment.

Studs 55 are of sufficient length to extend through the adjacent portion of the sleeve end and through holes 56 formed in cap 13 to engage nuts 57 on the exterior surface of cap 13. Thus it is evident that upon tightening nuts 57, ring 49 and cap 13 compress the sleeve end and its contained reinforcing cords into groove 45 and into sealing engagement with the exterior surface of tube 11, beveled face 52 engaging the adjacent portion of the sleeve end to force it against the outer rim of cap 13 and notch 53 engaging a portion of the sleeve to prevent its slipping or pulling out and forcing it into contact with groove 45.

To admit air into compartments 21 and 22, a tube 58 is provided passing through a hole 59 formed in the end of the sleeve. Sealing of the tube is accomplished by a nut 61 engaging an outer threaded portion thereof in combination with a flange 62 on the inner end of the tube, flange 62 serving to compress the adjacent sleeve portion and effect a seal. A one-way valve 63 of conventional type is secured to the end of tube 58 to admit air to compartments 21 and 22 and prevent the escape of air therefrom. If it is desired to maintain compartments 21 and 22 at different pressures, a similar tube may be provided leading into compartment 21.

To facilitate handling of the curing bag, handles may be provided as at 64.

Heating of the curing bag of Figure 1 is preferably accomplished by steam at any desired pressure and temperature admitted to tube 11 through a suitable fitting designated at 65. Since considerable condensate is formed within the tube a discharge tube 66, which may be formed of flexible material so that it will always rest on the bottom of tube 11, is provided leading from the lowest point of the heating element to member 39 to which it is sealingly secured through a tapered thread and tap connection 67. A passage 68 is formed in member 39 through which the condensate may pass to a pipe 69 and thence to a suitable point of discharge.

From the above description, it is evident that a ready method of assembly and sleeve replacement is afforded. In assembling the unit, the sleeve 12, including the retaining rings and studs, is slipped over the heating element 11, and end assemblies 13 and 14 fitted on the ends of the heating element with holes 56 receiving studs 55. Nuts 48 and 57 are added and tightened and the unit is ready for use. In replacing a worn out sleeve, the procedure is reversed, the end assemblies being removed and the old sleeve slid off the heating element while a new one is slid on. By reason of the fact that the useful life of the heating element and the end assemblies are extended indefinitely, great economies can be effected in such a tire curing bag since the sleeve elements by reason of the high temperatures and the nature of the material from which they are formed become worthless after a relatively short period of time.

Steam is not always available as a heating medium and from standpoints of efficiency and economy, other sources of heat such as electricity may be more desirable if available. Hence, my invention provides means whereby different sources of heat may be utilized in the same curing bag merely by the interchange of a few simple fittings.

A curing bag which has been changed from steam heating to electrical heating is shown in Figure 3, and will now be described in detail. To avoid repetition in description, reference will be made to corresponding parts of the different modifications by corresponding numerals. A tube 11 is utilized as a base for the formation of the curing bag, a sleeve 71 being disposed thereunder in concentric relation thereto. Sleeve 71 is of general pear shape in cross section in order to easily conform to the shape of the tire within which it is placed. Sleeve 71 is built up preferably of rubber and several layers of cord fabric with the cords thereof running longitudinally of the sleeve in order not to hinder its radial expansion when subjected to air pressure. An annular space 72 is defined between sleeve 71 and heating element 11 in which air pressure is maintained to distend the sleeve to the required extent, a suitable check valve and connection (not shown) being provided for the introduction of air. Sleeve 71 is provided at its ends with a plurality of layers of reinforcing cords designated generally at 73. The ends of sleeve 71 are formed with inturned flange portions 74 which are designed to engage a relatively large portion of the circumferential surface of heating element 11.

To further facilitate the replacement of sleeves, the curing bag of Figure 3 is provided with only one detachable cap i. e., cap 75, cap 76 being preferably welded to heating unit 11 at 77. A reinforcing ring 78 is provided within the end of sleeve 72, the outer face thereof being annularly corrugated as shown at 79 to provide a series of concentric sealing surfaces. The edges of ring 79 are preferably formed at an angle to face 79 whereby, on drawing up the ring, the edges will force the adjacent sleeve portions against the interior of cap 76 and tube 11. Cap 76 is formed with an annular groove 81, also provided with annular corrugations in the face thereof. A flange 82 of smaller diameter than and concentric with groove 81 is provided on cap 76 adjacent to and surrounding the end of tube 11. Ring 78 is provided with studs 83 that pass through corresponding holes in cap 76 and engage nuts 84 on the outer face thereof.

Cap 75, as previously indicated, is detachably secured to tube 11 whereby it can be removed and sleeves changed on the tube. The sleeve end and adjacent cap 75 are substantially identical with the corresponding elements at the opposite end of the tube, reinforcing cords 73, ring 78 and studs 83 being provided therein. However tapped holes 85 are formed in closure member 36 to accommodate bolts 86 and secure cap 75 thereto. To further insure a sealed joint, a gasket 87 of any suitable material may be placed between member 36 and cap 75 at the annular area of contact adjacent bolts 86. Cap 75 is formed with an annular groove 88 disposed opposite ring 78. Differing from groove 81 of cap 76, however, which is annularly corrugated, groove 88 contains a gasket 89 of suitable material. Immediately in front of the gasket an annular ring or washer 91 is disposed with an annularly corrugated face positioned opposite ring 78. Nuts 92 are provided to engage the outer ends of studs 83.

In assembling this type of curing bag, sleeve 72 is slid over tube 11 and so rotated that studs 83 engage the corresponding holes in cap 76. Nuts 84 are then applied and tightened, compressing the sleeve end and reinforcing cords 78. The corrugated faces on the ring 78 and groove 81 insure an air tight seal and a sufficiently tight grasp of the sleeve end to prevent its blowing or pulling out of the end assembly.

After securing cap 76, cap 75 is placed on the left end of the sleeve so that studs 83 will engage their corresponding holes and automatically align tapped holes 85 with the bolt holes formed in cap 75. Bolts 86 and nuts 92 are then applied and tightened, thus completing the sleeve assembly.

Electrical heating means are disclosed in connection with the curing bag of Figure 3 although it is to be understood that any suitable heating means may be substituted therefor. The heating means comprises a coupling 93 threaded to engage tapped aperture 38 and formed with an enlarged portion 94, also threaded to form part of a union connection with nut 95. An electrical heating element 96 preferably of the immersion type, is disposed within the tube 11 extending substantially the full length thereof. Element 96 is suitably secured to an insulated coupling member 97 upon which are arranged suitable binding posts 98 or other means for connection to a suitable source of current. Coupling 97 is mounted in a member 99 having a flange 101 thereon that is arranged to be secured between nut 95 and flange 94 of the union connection. The union connection is desirable in order that it may be tightened without rotating the heating element 96, it thus being possible to make the latter of arcuate shape and position it along the longitudinal axis of tube 11.

At the opposite end of tube 11, a plug 102 is provided in aperture 38. At the outer end of the plug, a member 103 is provided which is adapted to contain a thermostat of either fluid, bimetallic or other conventional type and suitably connected to safely control the current to heating element 96.

In operation the interior of tube 11 is preferably filled with liquid and heating element 96 is turned on. The liquid becomes heated and in turn communicates its heat to the surrounding sleeve 71. It is desirable to have the liquid present in tube 11 to more evenly distribute the heat from element 96 and to insure a continued heat at the selected temperature. The provision of a thermostat in tube 11 operating to control element 96 prevents the rise of temperature above that which would cause burning and deterioration of either the sleeve or the tire being treated, or above that which would produce dangerously high pressure.

Obviously, automatic temperature control means may also be applied to a steam heating unit or units heated by other means. If desired the thermostat may be placed or built inside tube 11 to avoid any projecting portions at the end caps that might be broken off in handling. Such an arrangement is also more advantageous since the element is located directly in the heating medium and is more responsive thereto. Such heat control means may also be used with bags of the endless or circular type as distinguished from curing bags of relatively short length as herein illustrated.

In Figures 4, 5 and 6, I have shown still further methods of securing and sealing sleeve ends in combination with novel types of end assemblies. For convenience in illustration, the heating unit and surrounding sleeve have been shown as straight rather than curved as the corresponding parts in Figures 1 and 3. These end assemblies are designed to take the place of that seen at the left end of the bag of Figure 3, but, obviously, may be used in any desired relationship.

With particular reference to Figure 4, a tube 11 is provided with a closure 36, preferably welded thereto, an opening 38 being provided in the closure for the reception of any desired fitting generally indicated at 39. A sleeve 104 is positioned around tube 11, the sleeve being formed with longitudinal reinforcing cord layers 105 and angularly-arranged cord layers 106 for reinforcing the ends in the same manner as described in connection with the curing bag of Figure 1. The sleeve end is formed with a relatively large internal flange 107 arranged to tightly embrace tube 11. An annular air chamber 108, hermetically sealed, is formed in flange 107 and is so arranged as to cooperate with a concave face 111 of an annular reinforcing ring 109 formed with the sleeve in a manner to be described. Ring 109 is preferably provided with annular corrugations on its face and is so positioned as to cooperate with an annularly corrugated faced groove 112 formed in a cap 113. Cap 113 is also provided with an internally extending annular flange 114 closely fitting the end of tube 11 and terminating in a wedge-shaped or sharpened end 115. Studs 116 are provided in ring 109 to extend through the adjacent end of the sleeve and through hole in cap 113 to engage nuts 117. A rounded projection 118 may be formed on cap 113 to engage a complementary hole 119 formed in closure 36 whereby the cap may be readily aligned with the remaining elements of the end assembly. On fitting 39 is threaded a locknut 121.

The manner of effecting the seal is quite obvious from Figure 4. As the nuts 117 and 121 are tightened, ring 109 compresses a portion of the sleeve end into groove 112, the corrugated faces of both the ring and groove assisting in effectually securing the material. At the same time, concave face 111 of ring 109 and wedge-shaped head 115 of flange 114 cooperate to compress the air in chamber 108 which in turn forces the surrounding sleeve material into sealing contact with tube 11 and further effects the seal. If desired, chamber 108 may be connected to the interior of the sleeve to receive air pressure therefrom or a separate air connection may be provided for chamber 108 whereby a pressure either higher or lower than that existing in the sleeve may be employed to futher promote the seal. A higher pressure in chamber 108 than in the sleeve is advantageous because any leakage of air will be from the chamber to the sleeve thereby conserving the heated air within the sleeve. A lower pressure in chamber 108 possesses the advantage that the seal between chamber 108 and the atmosphere is less liable to break down because of the lower air pressure exerted upon it.

With reference to Figure 5, tube 11 has a closure member 122 welded thereto, closure 122 being formed with a corrugated face 123 and a threaded aperture 124 for the reception of a fitting 39. A cap 125, loosely fitted on fitting 39, is formed with an annularly corrugated face 126 disposed opposite face 123. A sleeve 127 is provided of the same general construction as sleeve 105 except that the end thereof, with reinforcing cord layers 128, extends to a point between corrugated faces 123 and 126. An annular reinforcing ring 129 is provided in the end of the sleeve in conjunction with studs 131 and nuts 132 to draw the sleeve end up against the inner surface of cap 125. A nut 133 threadedly engages fitting 39 to force cap 125 toward closure 122 and compress the sleeve end therebetween. It will be noted that face 126 of cap 125 is shaped to form a concave chamber, the largest end of which is positioned adjacent fitting 39, the point of maximum pressure being along the line of the wall of tube 11. Such a concavity further assists in retaining the sleeve end by reason of the relatively large amount of sleeve material compressed adjacent fitting 39 as compared with the small space formed between the wall of tube 11 and the adjacent portion of the cap.

In assembling this type of joint, the sleeve end is first compressed by ring 129 into the inner face of cap 125 by tightening nuts 132, the beveled or inclined winged side edges of ring 129 forcing the adjacent sleeve portions against cap 125 and tube 11. Nut 133 is taken up to compress and securely seal the end of the sleeve between corrugated faces 123 and 126, the presence of ring 129 with its winged edges and reinforcing cord layers 128 preventing any flow or slipping out of the sleeve end from between the compression members.

In Figure 6, I have shown a still further modified type of curing bag wherein a removable insert or inner tube is employed for the purpose of inflating the sleeve. A tube 11 with closure 36 and fitting 39 is provided as in the prior modifications. A sleeve 134, provided with a series of angularly-arranged reinforcing cord layers designated at 135, extends into a grooved cap 137 and is retained therein by an annular reinforcing ring 136, connected by studs to nuts 139 on the outer face of cap 137, cap 137 being held in place by a nut 138 engaging fitting 39. In addition to the inclined or beveled side edges of rings 129 and 136, it will be noted that the faces of the rings are concave whereby the adjacent sleeve portions may be more securely gripped.

Within the annular space defined by sleeve 134 and tube 11, an annular insert 141 is fitted, the insert being preferably made of rubber or a like expansible material to form a closed chamber or inner tube. Insert 141 comprises an annular portion 142 arranged adjacent tube 11 and an annular portion 143 arranged adjacent sleeve 134, portions 142 and 143 being joined at their ends by portions 145.

In the modification shown, the two annuli do not extend entirely around tube 11 but are split along a longitudinal line and joined by portions 146 which extend the full length of the curing bag (Fig. 7). The split portion is to facilitate assembly of the insert with the other elements of the bag structure. However, it is to be understood that the annuli may be circumferentially connected to form closed sleeves if desired. A suitable connection is provided in either of the end assemblies for introducing air into the insert.

The insert may be used either in new curing bags or old bags. Its advantage with new bags is that when it becomes deteriorated, it alone need be replaced, the sleeve, heating tube and end assemblies being capable of further use. While the sleeve may likewise deteriorate, it is not necessary with the use of the insert, to discard the sleeve when it no longer is air tight since the air pressure is maintained within the insert and there is no need for maintaining a sealed sleeve.

With old bags wherein the sleeve has deteriorated to such an extent that it cannot retain air under the required pressure, an insert need only be placed in the annular space between the tube and sleeve whereby the curing bag again becomes ready for use and the sleeve that would otherwise be discarded is available for use in a great many more tire cures. Obviously, such uses of the insert permit great economies in the use of tire curing bags. If desired, the insert may be formed or provided with partitions such as partitions 18 and 19 of the modification shown in Figure 2. Insulating material or a cooling medium may be used in either of the compartments thus defined or an insulating chamber such as chamber 24 may be provided, leaving the compartments free for fluid pressure. Obviously the number of partitions employed may be varied to suit the size of areas to which heat is to be directed and those which are to be protected from heat. While the insert has been described and illustrated in connection with a curing bag of relatively short length, it is to be understood that its use is not so limited, but it may also be employed in curing bags of the endless or circular type.

In a preferred modified construction of the curing bag of this invention, the outer sleeve may be formed with a recess or pocket in any desired area thereof and of any desired size. A heating element such as an electrical unit or small fluid tubes may be placed therein and carried with a removable sleeve which contacts with the tire being treated. In such a construction if the heating element goes bad or the inside sleeve develops a leak, the removable sleeve may readily be removed and the leak or heating element repaired. In such a construction, the internal heating element may be omitted or retained. If omitted, a suitable supporting structure as a rod or chain may be substituted therefor to hold the end assemblies in position.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tire repair bag comprising an expansible sleeve and a plurality of layers of flexible strands secured at the ends of said sleeve disposed in angular relation to one another and to the longitudinal axis of said sleeve, said strands serving to reinforce the ends of said sleeve while permitting expansion of said sleeve.

2. A tire repair bag comprising an expansible sleeve; cap members to engage the ends of said sleeve; means within said sleeve spacing said cap members; and a plurality of layers of strands arranged in angular relation to one another secured adjacent the ends of said sleeve and cooperating with said cap members to hermetically seal the ends of said sleeve while permitting radial expansion thereof.

3. A tire repair bag comprising an expansible sleeve; removable cap members to detachably engage the ends of said sleeve; means within said sleeve spacing said cap members; and a plurality of layers of cords arranged in angular relation to one another secured adjacent the ends of said sleeve and cooperating with said cap members to hermetically seal the ends of said sleeve while permitting radial expansion thereof.

4. A tire repair bag comprising an expansible sleeve with normally open ends; removable cap members shaped to engage the ends of said sleeve; means within said sleeve spacing said cap members; annular shaped members secured in the ends of said sleeve; and means to engage said annular shaped members and compress the ends of said sleeve into said cap members.

5. A tire repair bag comprising an expansible sleeve; cap members to engage the ends of said sleeve; means within said sleeve spacing said cap members; a plurality of layers of cords arranged in angular relation to one another and secured adjacent the ends of said sleeve; annular rings secured in the ends of said sleeve adjacent said cords; and means to engage said rings and hermetically seal the ends of said sleeve and said cords within said cap members while permitting radial expansion of said sleeve.

6. A tire repair bag comprising an expansible sleeve; cap members to engage the ends of said sleeve; a spacing element symmetrically disposed within said sleeve spacing said cap members; a plurality of layers of cords arranged in angular relation to one another secured adjacent the ends of said sleeve; annular-shaped members secured in the ends of said sleeve adjacent said cords; and means to engage said annular shaped members and hermetically seal the ends of said sleeve within said cap members while permitting radial expansion of said sleeve.

7. In a curing bag in combination an expansible sleeve having ends; a spacing member disposed therein and terminating adjacent said ends; a cap member fixedly secured to one end of said spacing member; means secured to the adjacent end of said sleeve for sealing said end in said cap member; a second cap member detachably secured to the opposite end of said spacing member; means secured to the adjacent end of said sleeve for sealing said end in said second cap member; and means for detachably securing said second cap member to said spacing member.

8. In a curing bag in combination an expansible sleeve having ends; a spacing member disposed therein and terminating adjacent said ends; a cap member for sealing one end of said sleeve to one end of said spacing member comprising means on said cap member for engaging the end of said spacing member; annular reinforcing means secured to the end of said sleeve; and means to engage said cap member and said reinforcing means to seal the end of said sleeve.

9. In a curing bag in combination an expansible sleeve provided with a plurality of layers of reinforcing cords adjacent the ends of the sleeve; a spacing member within said sleeve; a cap member detachably secured to said spacing member to engage the end of said sleeve; an annular ring secured in the end of said sleeve opposite said cap member; and means to draw said ring toward said cap member whereby the sleeve end is compressed and hermetically sealed.

10. The combination as claimed in claim 9 wherein the opposing faces of the cap member and the annular ring are corrugated.

11. The combination as claimed in claim 9 wherein the inner surface of the annular ring is angularly shaped to force the adjacent portion of the sleeve into contact with the spacing member to effect sealing therewith.

12. In a curing bag in combination an expansible sleeve; a spacing member within said sleeve; a cap member secured to the end of said spacing member to receive the end of said sleeve; annular reinforcing means within the end of said sleeve and arranged opposite said cap member; means associated with said cap member for drawing said annular reinforcing means toward said cap member to secure said sleeve; a flange mounted on said cap member concentric to and spaced from said spacing member whereby on drawing said annular reinforcing means toward said cap member, said flange forces said sleeve end against the end of said spacing element to effect sealing therewith.

13. A tire repair bag comprising an expansible sleeve arranged to be filled with fluid; cap members to engage the ends of said sleeve; spacing means within said sleeve to space said cap members; an annular fluid chamber positioned in the end of said sleeve adjacent said cap members; and means to sealingly engage said cap members and said sleeve ends, the fluid in said fluid chamber being arranged to prevent the escape of fluid from said sleeve.

14. In a curing bag in combination an expansible sleeve having ends and being provided with a plurality of layers of reinforcing cords adjacent said sleeve ends; a heating tube within said sleeve; closure means for the end thereof; a cap member extending over said closure means to engage said sleeve end and cords therebetween to effect sealing; and additional means associated with said cap member for retaining said sleeve end between said closure member and said cap member.

15. In a tire curing bag in combination, an expansible sleeve; a heating element fitted therein; and means associated with said element whereby a choice of fittings may be utilized to permit the use of different sources of heat.

16. A tire curing bag comprising an expansible sleeve; a heating element within said sleeve and defining a closed chamber therewith; partitions dividing said chamber into more than one compartment; and means to provide a heat differential between said compartments.

17. A tire curing bag comprising an expansible sleeve; a heating element positioned within said sleeve and defining a closed chamber therewith; partitions dividing said chamber into a series of compartments; and insulating means positioned around a part of the surface of said heating element to retard the heating of one of said compartments.

18. A tire curing bag comprising an expansible sleeve, heating means within said sleeve and a pressure container distinct from said heating means and within said sleeve adapted when subjected to pressure to force said sleeve against the surface of the tire being treated.

19. A tire curing bag comprising an expansible sleeve; cap members to engage the ends of said sleeve; means in said sleeve for spacing said cap members and defining an annular chamber with said sleeve; and a removable pressure container arranged to fit within said annular chamber and when subjected to pressure to force said sleeve against the surface of the tire being treated.

CLYDE M. SEMLER.